United States Patent
Ono et al.

(10) Patent No.: US 8,728,702 B2
(45) Date of Patent: May 20, 2014

(54) TONER AND TONER BINDER

(75) Inventors: Takashi Ono, Kyoto (JP); Yoko Sakurai, Kyoto (JP)

(73) Assignee: Sanyo Chemical Industries, Ltd., Kyoto (JP)

(*) Notice: Subject to any disclaimer, the term of this patent is extended or adjusted under 35 U.S.C. 154(b) by 0 days.

(21) Appl. No.: 13/480,466

(22) Filed: May 24, 2012

(65) Prior Publication Data

US 2012/0308926 A1 Dec. 6, 2012

Related U.S. Application Data

(62) Division of application No. 11/921,393, filed as application No. PCT/JP2006/310816 on May 30, 2006, now abandoned.

(30) Foreign Application Priority Data

May 31, 2005 (JP) ................................. 2005-160671

(51) Int. Cl.
*G03G 9/087* (2006.01)

(52) U.S. Cl.
USPC ........................ 430/137.15; 528/181; 525/438

(58) Field of Classification Search
USPC ............... 528/181, 438; 430/137.15; 525/438
See application file for complete search history.

(56) References Cited

U.S. PATENT DOCUMENTS

2004/0131961 A1* 7/2004 Watanabe et al. ........... 430/108.4
2006/0008723 A1* 1/2006 Fujikawa et al. ........... 430/108.6

FOREIGN PATENT DOCUMENTS

JP 2003-113234 * 4/2003 ............. C08G 63/85

OTHER PUBLICATIONS

Translation of JP 2003-113234 published Apr. 2003.*

* cited by examiner

*Primary Examiner* — Peter Vajda
(74) *Attorney, Agent, or Firm* — Edwards Wildman Palmer LLP

(57) ABSTRACT

A polyester resin toner binder which gives a toner with good anti-blocking property at high temperature and high humidity and good low-temperature fixing ability. The present invention is directed to a toner binder for developing electrostatic charge images, which binder comprises a condensation-polymerization polyester resin, the polyester resin being a product formed in the presence of a catalyst (a) represented by the following general formula (I):

$$\text{Ti}(-X)_m(-OR)_n \tag{I}$$

wherein R, X, m and n are as defined herein.

12 Claims, No Drawings

TONER AND TONER BINDER

CROSS-REFERENCE TO RELATED APPLICATIONS

This application is a divisional of U.S. application Ser. No. 11/921,393, filed Apr. 6, 2009, pending, which is the national stage application pursuant to 35 U.S.C. §371 of PCT Application No. PCT/JP2006/310816, filed May 30, 2006, which claims priority to Japanese Patent Application No. 2005-160671, filed May 31, 2005. The contents of the foregoing applications are hereby incorporated by reference in their entirety.

TECHNICAL FIELD

The present invention relates to a toner binder comprising polyester resin which is useful for dry toners to be used for the development of electrostatic images or magnetic latent images in the electrophotographic process, electrostatic recording process, electrostatic printing process, etc., and a toner using the toner binder.

BACKGROUND ART

Use of a polyester resin as a binder for improving the low-temperature fixing ability of a toner is known (see, for example, patent documents 1, 2). Reduction in molecular weight or glass transition temperature (henceforth, abbreviated as Tg) is needed in order to further improve the low-temperature fixing ability of a toner. In such cases, however, there is a problem that toners are somewhat poor in anti-blocking property at high temperature and high humidity.
Patent document 1: JP 62-178278 A
Patent document 2: JP 4-313760 A

DISCLOSURE OF THE INVENTION

Problem to be Solved by the Invention

An object of the present invention is to provide toner binders comprising polyester resin which impart good anti-blocking property at high temperature and high humidity and good low-temperature fixing ability to toners, and to provide toners.

Means for Solving the Problem

The inventors of the present invention studied assiduously to solve such problems and, as a result, have reached the invention by finding that the problems can be solved by use of a toner binder comprising a condensation-polymerization polyester resin produced in the presence of a Ti catalyst with a specified structure.

The present invention is directed to a toner binder for developing electrostatic charge images, which binder comprises a condensation-polymerization polyester resin, the polyester resin being a product formed in the presence of a catalyst (a) represented by the following general formula (I); and a toner for developing electrostatic charge images, which toner comprises (A) the aforementioned toner binder for developing electrostatic charge images and (B) a colorant:

$$\text{Ti}(-X)_m(-OR)_n \quad (I)$$

wherein R is H or a hydrocarbon group having from 1 to 24 carbon atoms which may contain from 1 to 3 ether bonds and/or from 1 to 2 hydroxyl groups; X is a residue formed by removing H of one carboxyl group from an aromatic mono- or polycarboxylic acid, provided that in the case of a polycarboxylic acid, a carboxyl group other than said one carboxyl group may intramolecularly polycondense with an OR group in the same molecule to form a ring structure or may intermolecularly polycondense with an OR group in another molecule to form a structure containing from 2 to 5 Ti atoms; m=1 to 3, n=1 to 3, and the sum of m and n is 4.

Effect of the Invention

The toner of the present invention comprising the toner binder of the present invention comprising a condensation-polymerization polyester resin is excellent in anti-blocking property at high temperature and high humidity and is of good low-temperature fixing ability. Further, a toner with good resin properties can be obtained without use of organic tin, which will cause environmental problems, as a catalyst.

BEST MODE FOR CARRYING OUT THE INVENTION

In the following, the present invention is described in detail.

The titanium-containing catalyst (a) used in the present invention is a compound expressed by the general formula (I) provided above. Two or more compounds of structures satisfying formula (I) may be used combinedly.

In general formula (I), R is H or a hydrocarbon group having from 1 to 24 carbon atoms which may contain from 1 to 3 ether bonds and/or from 1 to 2 hydroxyl groups. The number of carbon atoms of such hydrocarbon groups is preferably from 1 to 6, and more preferably from 1 to 4.

Specific examples of hydrocarbon groups having from 1 to 24 carbon atoms include: aliphatic hydrocarbon groups, aliphatic hydrocarbon groups containing an ether bond and/or a hydroxyl group (e.g. methyl group, ethyl group, n-propyl group, isopropyl group, n-butyl group, n-hexyl group, n-octyl group, β-methoxyethyl group, β-ethoxyethyl group and β-hydroxyethyl group), aromatic hydrocarbon groups, aromatic hydrocarbon groups containing an ether bond and/or a hydroxyl group [e.g. phenyl group; hydroxyphenyl group; and residues resulting from elimination of one OH group from alkylene oxides adducts (addition molar number: from 1 to 3) of bisphenol A, bisphenol F, bisphenol S, etc. with alkylene oxides having from 2 to 4 carbon atoms [e.g. ethylene oxide (henceforth, abbreviated as EO), propylene oxide (henceforth, abbreviated as PO) and butylene oxide (henceforth, abbreviated as BO)].

Among such R, hydrocarbon groups having from 1 to 6 carbon atoms are preferable, and ethyl group, n-propyl group, isopropyl group, n-butyl group and n-hexyl group are more preferable. n-Propyl group, isopropyl group and n-butyl group are particularly preferable.

X is a residue formed by removing H of one carboxyl group from an aromatic mono- or polycarboxylic acid, wherein in the case of a polycarboxylic acid, a carboxyl group other than that which is bonding to a Ti atom to form the residue may intramolecularly polycondense with an OR group in the same molecule (i.e., a hydroxyl group directly bonding to the Ti atom, when R is H; an alkoxyl group, when R is a hydrocarbon group; or a hydroxyl group when R is a hydrocarbon group having 1 or 2 hydroxyl groups) to form a ring structure, or may intermolecularly polycondense with an OR group (the same as the foregoing) in another molecule of the titanium-containing catalyst (a) to form a repetitive structure containing two or more Ti atoms.

The aromatic carboxylic acid may preferably be ones having from 7 to 50 carbon atoms, examples of which include aromatic monocarboxylic acids such as benzoic acids (e.g., benzoic acid, parahydroxybenzoic acid and paramethylbenzoic acid) and naphthalenemonocarboxylic acid; and from divalent to hexavalent or higher valent aromatic polycarboxylic acids, such as phthalic acids (e.g., terephthalic acid, isophthalic acid and orthophthalic acid), naphthalene dicarboxylic acid, trimellitic acid and pyromellitic acid.

In the case of an aromatic polycarboxylic acid, a repetitive structure containing two or more Ti atoms may be formed by the carboxyl groups as previously mentioned, but in such a case, the number of the Ti atoms in one molecule is from 2 to 5. The presence of six or more Ti atoms in one molecule is undesirable because it results in reduced catalytic activity.

Residues desirable as X are residues of phthalic acids (e.g., terephthalic acid, isophthalic acid and orthophthalic acid) and residues of benzoic acids (e.g., benzoic acid, parahydroxybenzoic acid and paramethylbenzoic acid), and especially a desirable residue is the residue of terephthalic acid, isophthalic acid, and orthophthalic acid.

In formula (I), m is 1 to 3, n is 1 to 3, and the sum of m and n, namely the bond valence of the Ti atom, is 4. It is preferable that m is 1 to 2 and n is 2 to 3. If m exceeds 3, the catalytic activity is deteriorated. On the other hand, if n exceeds 3, the hydrolysis resistance is deteriorated. Both the situations are therefore undesirable in the production of a polyester. Cases where m is 1 or 2 are preferable because the catalytic activity is very high. Cases where the bond valence of a Ti atom is not 4 are undesirable because the catalytic activity is poor or a side reaction takes place even though the structure is similar to formula (I).

Specific examples of the compound expressed by general formula (I) include titanium triisopropoxybenzenecarboxylate, titanium tributoxybenzenecarboxylate, titanium triisopropoxyterephthalate, titanium tributoxyterephthalate, titanium triisopropoxyisophthalate, titanium triisopropoxyphthalate, titanium diisopropoxydibenzenecarboxylate, titanium dibutoxydibenzenecarboxylate, titanium diisopropoxyditerephthalate, titanium dibutoxyditerephthalate, titanium diisopropoxydiisophthalate, titanium diisopropoxydiphthalate, titanium dihydroxydibenzenecarboxylate, titanium dihydroxyditerephthalate, titanium dihydroxydiisophthalate, titanium dihydroxydiphthalate, and their intramolecular or intermolecular polycondensates.

From the viewpoint of catalytic activity in polyester polymerization, the titanium-containing catalyst (a) used in the present invention preferably has a solubility in water of 5 g/100 ml or less at 30° C., more preferably 2 g/100 ml or less, and particularly preferably 1 g/100 ml or less. A case where the solubility is 5 g/100 ml or less is preferable in view of the durability of catalytic activity because the catalyst is hardly hydrolyzed during a polymerization reaction.

Such a titanium-containing catalyst (a) can be obtained by, for example, causing commercially available titanium tetraalkoxide and aromatic carboxylic acid to react at 70 to 90° C. in ethyl acetate.

The condensation-polymerization polyester resin to constitute the toner binder of the present invention includes polyester resins (AX), which are polyol-polycarboxylic acid polycondensates, modified polyester resins (AY) obtained by further reacting (AX) with a polyisocyanate (b) and/or a polyepoxide (c), and the like. The resins (AX), (AY) and so on may be used singly or as a mixture of two or more species.

The polyol includes diols (g) and trihydric or higher hydric polyols (h), and the polycarboxylic acid includes dicarboxylic acids (i) and trivalent or higher valent polycarboxylic acids (j). These may be used in combination of two or more species, respectively.

Examples of the polyester resins (AX) and (AY) include those listed below. These may also be used in combination.
(AX1): Linear polyester resins produced by using (g) and (i).
(AX2): Nonlinear polyester resins produced by using (h) and/or (j) together with (g) and (i).
(AY1): Modified polyester resins produced by reacting (AX2) with (b) and/or (c).

Preferable diols (g) are those having a hydroxyl value of 180 to 1900 (mg-KOH/g; hereinafter the same). Specific examples include alkylene glycols having 2 to 36 carbon atoms (ethylene glycol, 1,2-propylene glycol, 1,3-propylene glycol, 1,4-butylene glycol, 1,6-hexanediol, etc.); alkylene ether glycols having 4 to 36 carbon atoms (diethylene glycol, triethylene glycol, dipropylene glycol, polyethylene glycol, polypropylene glycol, polybutylene glycol, etc.); alicyclic diols having 6 to 36 carbon atoms (1,4-cyclohexanedimethanol, hydrogenated bisphenol A, etc.); adducts of the above-mentioned alicyclic diols with an alkylene oxide(s) having 2 to 4 carbon atoms (EO, PO, BO, etc.) (additional molar number: 1 to 30); and adducts of bisphenols (bisphenol A, bisphenol F, bisphenol S, etc.) with an alkylene oxide(s) having 2 to 4 carbon atoms (EO, PO, BO, etc.) (additional molar number: 2 to 30).

Preferred among these are alkylene glycols having 2 to 12 carbon atoms, alkylene oxide adducts of bisphenols, and combinations thereof. More preferred are alkylene oxide adducts of bisphenols, alkylene glycols having 2 to 4 carbon atoms, and combinations of two or more kinds thereof.

The hydroxyl value and acid value referred to in the above and subsequent descriptions are determined by the methods defined in JIS K 0070.

The trihydric or higher hydric (i.e., tri- to octahydric or higher hydric) polyols (h) preferably are polyols having a hydroxyl value of 150 to 1900. Specific examples thereof include tri- to octahydric or higher hydric aliphatic polyols having 3 to 36 carbon atoms (alkane polyols and their intramolecular or intermolecular dehydration products, e.g. glycerol, triethylolethane, trimethylolpropane, pentaerythritol, sorbitol, sorbitan, polyglycerol and dipentaerythritol, etc.; sugars and their derivatives, e.g. sucrose and methyl glucoside; etc.); adducts of the above-mentioned aliphatic polyols with an alkylene oxide(s) having 2 to 4 carbon atoms (EO, PO, BO, etc.) (additional molar number: 1 to 30); adducts of trisphenols (trisphenol PA etc.) with an alkylene oxide(s) having 2 to 4 carbon atoms (EO, PO, BO, etc.) (additional molar number: 2 to 30); and adducts of novolak resins (phenol novolak, cresol novolak, etc.; average degree of polymerization: 3 to 60) with an alkylene oxide(s) having 2 to 4 carbon atoms (EO, PO, BO, etc.) (additional molar number: 2 to 30).

Preferred among them are tri- to octahydric or higher hydric aliphatic polyols and alkylene oxide adducts of novolak resin (additional molar number: 2 to 30). More preferred are alkylene oxide adducts of novolak resin.

Preferable dicarboxylic acids (i) are those having an acid value of 180 to 1250 (mg-KOH/g; hereinafter the same). Specific examples thereof include alkanedicarboxylic acids having 4 to 36 carbon atoms (succinic acid, adipic acid, sebacic acid, etc.) and alkenylsuccinic acids (dodecenylsuccinic acid, etc.); alicyclic dicarboxylic acids having 4 to 36 carbon atoms [dimer acid (dimerized linoleic acid), etc.]; alkenedicarboxylic acids having 4 to 36 carbon atoms (maleic acid, fumaric acid, citraconic acid, mesaconic acid, etc.); and aromatic dicarboxylic acids having 8 to 36 carbon atoms (phthalic acid, isophthalic acid, terephthalic acid, naphthalenedicarboxylic acid, etc.). Preferred among them are alkenedicarboxylic acids having 4 to 20 carbon atoms and aromatic dicarboxylic acids having 8 to 20 carbon atoms. Also usable as (i) are acid anhydrides and lower (C1-C4) alkyl esters (methyl ester, ethyl ester, isopropyl ester, etc.) of those mentioned above.

The trivalent or higher valent (i.e., tri- to hexavalent or higher valent) polycarboxylic acids (j) preferably are polycarboxylic acids having an acid value of 150 to 1250. Specific examples include aromatic polycarboxylic acids having 9 to 20 carbon atoms (trimellitic acid, pyromellitic acid, etc.); and vinyl polymers of unsaturated carboxylic acids [number average molecular weight (hereinafter referred to as Mn, determined by gel permeation chromatography (GPC)): 450 to 10000] (styrene-maleic acid copolymer, styrene-acrylic acid copolymer, α-olefin-maleic acid copolymers, styrene-fumaric acid copolymer, etc.). Preferred among these are aromatic polycarboxylic acids having 9 to 20 carbon atoms. More preferred are trimellitic acid and pyromellitic acid. Also usable as the trivalent or higher valent polycarboxylic acids (j) are acid anhydrides and lower (C1-C4) alkyl esters (methyl ester, ethyl ester, isopropyl ester, etc.) of those mentioned above.

Also, the compounds (g), (h), (i) and (j) may be copolymerized with aliphatic or aromatic hydroxycarboxylic acids (k) having 4 to 20 carbon atoms and lactones (1) having 6 to 12 carbon atoms.

As hydroxycarboxylic acids (k), there are listed hydroxystearic acid, cured castor oil fatty acid and so on. Examples of lactones (i) include caprolactone etc.

Polyisocyanate (b) is a compound having at least two isocyanate groups and examples thereof include aromatic polyisocyanates, aliphatic polyisocyanates, alicyclic polyisocyanates, araliphatic polyisocyanates, modified products of these polyisocyanates (urethane group, carbodiimide group, allophanate group, urea group, biuret group, isocyanurate group or oxazolidone group-containing modification products), and mixtures of two or more of these compounds.

Aromatic polyisocyanates include, for example, aromatic diisocyanates having 6 to 16 carbon atoms (excluding the carbon in an NCO group; the same for the following polyisocyanates), aromatic triisocyanates having 6 to 20 carbon atoms, and crude products of these isocyanates. Specific examples include 1,3- and 1,4-phenylene diisocyanate, 2,4- and/or 2,6-tolylene diisocyanate (TDI), crude TDI, 2,4'- and/or 4,4'-diphenylmethane diisocyanate (MDI), crude MDI [phosgenated products of crude diaminodiphenylmethane {a condensate of formaldehyde with an aromatic amine (aniline) or its mixture: a mixture of diaminodiphenylmethane and a small amount (e.g. 5 to 20% by weight) of tri- or more functional polyamine}: polyarylpolyisocyanate (PAPI), etc.], naphthylene-1,5-diisocyanate and triphenylmethane-4,4',4"-triisocyanate.

Aliphatic polyisocyanates include, for example, aliphatic diisocyanates having 2 to 18 carbon atoms. Specific examples include 1,6-hexamethylene diisocyanate, 2,2,4-trimethylhexamethylene diisocyanate and lysine diisocyanate.

Alicyclic polyisocyanates include, for example, alicyclic diisocyanates having 4 to 16 carbon atoms. Specific examples include isophorone diisocyanate, 4,4'-dicyclohexylmethane diisocyanate (hydrogenated MD1), 1,4-cyclohexane diisocyanate and norbornane diisocyanate.

Araliphatic polyisocyanates include, for example, araliphatic diisocyanates having 8 to 15 carbon atoms. Specific examples include xylylene diisocyanate and α,α,α',α'-tetramethylxylylene diisocyanate.

Specific examples of modified polyisocyanates include urethane-modified MDI, carbodiimide-modified MDI, sucrose-modified TDI and castor oil-modified MDI.

Preferred as the above-mentioned (b) among these are TDI, MDI, hexamethylene diisocyanate, isophorone diisocyanat, and hydrogenated MDI.

The polyol-to-polyisocyanate reaction ratio, as expressed in terms of hydroxyl group [OH]-to-isocyanate group [NCO] equivalent ratio [OH]/[NCO], is preferably 2/1 to 1/1.1, more preferably 1.5/1 to 1/1.1, and particularly preferably 1.3/1 to 1/1.05. The polyol and isocyanate species to be used are selected in view of molecular weight adjustment so that the polyester-based toner binder finally prepared may have a glass transition point of 45 to 85° C.

The polyepoxide (c) includes, for example, polyglycidyl ethers [ethylene glycol diglycidyl ether, tetramethylene glycol diglycidyl ether, bisphenol A diglycidyl ether, bisphenol F diglycidyl ether, glycerol triglycidyl ether, pentaerythritol tetraglycidyl ether, glycidyl etherified phenol novolak (average degree of polymerization 3 to 60), etc.]; and diene oxides (pentadiene dioxide, hexadiene dioxide, etc.).

Preferred among them are polyglycidyl ethers. More preferred are ethylene glycol diglycidyl ether and bisphenol A diglycidyl ether.

The number of epoxy groups per molecule of (c) is preferably 2 to 8, more preferably 2 to 6, particularly preferably 2 to 4.

The epoxy equivalent of (c) is preferably 50 to 500. The lower limit is more preferably 70, particularly preferably 80, and the upper limit is more preferably 300, particularly preferably 200. When the number of epoxy groups and the epoxy equivalent are within the respective ranges mentioned above, both the developability and fixing ability are good. It is more desirable that both the number of epoxy groups per molecule and the epoxy equivalent are within the respective ranges mentioned above.

The polyol-to-polycarboxylic acid reaction ratio, as expressed in terms of hydroxyl group [OH]-to-carboxyl group [COOH] equivalent ratio [OH]/[COOH], is preferably 2/1 to 1/2, more preferably 1.5/1 to 1/1.3, and particularly preferably 1.3/1 to 1/1.2. The polyol and polycarboxylic acid species to be used are also preferably selected in view of molecular weight adjustment so that the polyester-based toner binder finally prepared may have a glass transition point of 45 to 85° C.

It is desirable for the condensation-polymerization polyester of the present invention that not less than 80%, more preferably 90% or more, of the ester bonds of the polyester are formed by dehydration condensation. Producing not less than 80% of ester bonds by dehydration condensation is preferable because it improves toner's durability and/or polluting property (scattering of the toner inside of a printer or a copier).

Toner binders are required to have different physical properties according to their intended use, for full-color use or monochrome use. Accordingly, the polyester resins are designed in different ways.

Thus, highly glossy images are required for full-color use, hence it is necessary to reduce the binder viscosity, whereas for monochrome use, gloss is not particularly required but hot offset property is regarded as important, hence highly elastic binders are needed.

For obtaining highly glossy images valuable in full-color copiers or the like, (AX1), (AX2), (AY1) and mixtures of these are preferred. In this case, low viscosity is preferred and, therefore, the proportion of (h) and/or (j) constituting the polyester resins is preferably such that the sum of the molar numbers of (h) and (j) amounts to 0 to 20 mole percent, more preferably 0 to 15 mole percent, and most preferably 0 to 10 mole percent, relative to the sum of molar numbers of (g) to (j)

For obtaining high hot offset resistance valuable in monochrome copiers and so forth, (AX2), (AY1) and mixtures of these are preferred. In this case, high elasticity is preferred and, therefore, polyester resins produced by using both (h) and (j) are particularly preferred. The proportion of (h) plus (j) is preferably such that the sum of the molar numbers of (h) and (j) is 0.1 to 40 mole percent, more preferably 0.5 to 25 mole percent, and most preferably 1 to 20 mole percent, relative to the sum of the molar numbers of (g) to (j).

From the gloss viewpoint, the tetrahydrofuran (THF)-insoluble matter content of the polyester resin for full-color use is preferably not more than 10%, and more preferably not more than 5%.

In the above and subsequent descriptions, "%" means "% by weight" unless otherwise stated.

The THF-insoluble fraction and THF-soluble fraction can be determined by the following method.

About 0.5 g of the sample is accurately weighed in a 200-ml stoppered Erlenmeyer flask, 50 ml of THF is added and, after 3 hours of refluxing with stirring and the subsequent cooling, the insoluble matter is filtered off using a glass filter. The THF-insoluble matter content (%) is calculated from the weight ratio between the weight of the resin fraction on the glass filter after 3 hours of drying under reduced pressure at 80° C. and the sample weight.

This filtrate is used as the THF-soluble fraction in the molecular weight measurement to be described later herein.

The polyester resin for monochrome use preferably has a THF-insoluble matter content of 2 to 70%, more preferably 5 to 60%, and most preferably 10 to 50%. At THF-insoluble matter content levels not lower than 2%, good hot offset resistance is obtained and, at levels not exceeding 70%, good low-temperature fixing ability is attained.

For both monochrome and full-color uses, the polyester resin preferably has a peak top molecular weight (Mp) of 1,000 to 30,000, more preferably 1,500 to 25,000, and most preferably 1,800 to 20,000. When the Mp is 1,000 or more, the thermal storage stability and powder flowability become improved and, when it is not more than 30,000, the pulverisability of the toner becomes improved and the productivity becomes better. The ratio of components having a molecular weight of 1,500 or less in the polyester is preferably 1.8% or less, more preferably 1.3% or less, and most preferably 1.1% or less. When the ratio of components having a molecular weight of 1,500 or less is 1.8% or less, the storage stability becomes better.

When a toner is produced using a toner binder (A) comprising the polyester resin of the present invention, the ratio of components having a molecular weight of 1,500 or less in the toner is preferably 1.8% or less, more preferably 1.3% or less, and most preferably 1.1% or less. When the ratio of components having a molecular weight of 1,500 or less is 1.8% or less, the storage stability becomes better.

In the above and the subsequent description, the Mp, Mn and ratio of components having a molecular weight of 1,500 or less of a polyester resin or toner are determined for the THF-soluble fraction by GPC under the following conditions.

Apparatus (example): HLC-8120 produced by Tosoh Corp.
Columns (example): TSK gel GMHXL (two columns)
TSK gel Multipore HXL-M (one column)
Measurement temperature: 40° C.
Sample solution: 0.25% THF solution
Solution injection amount: 100 μl
Detection apparatus: Refractive index detector
Reference material: Standard polystyrenes produced by Tosoh Corp. (TSK standard POLYSTYRENE) 12 points (Mw 1050, 2800, 5970, 9100, 18100, 37900, 96400, 190000, 355000, 1090000, 2890000 and 4480000)

The molecular weight corresponding to the maximum peak height on the chromatogram obtained is referred to as "peak top molecular weight (Mp)". The ratio of lower molecular weight components is evaluated using the ratio of peak areas obtained by division at a molecular weight of 1500.

For both monochrome and full-color uses, the acid value of the polyester resin is preferably within the range of 0.1 to 60, more preferably 0.2 to 50, and most preferably 0.5 to 40. When the acid value is within a range from 0.1 to 60, the charging property is good.

For both monochrome and full-color uses, the hydroxyl value of the polyester resin is preferably within the range of 1 to 70, more preferably 3 to 60, and most preferably 5 to 55. When the acid value is within a range from 1 to 70, the environmental stability is good.

For both monochrome and full-color uses, the Tg of the polyester resin is preferably within the range of 40 to 90° C., more preferably 50 to 80° C., and most preferably 55 to 75° C. When the Tg is within the range of 40° C. to 90° C., the thermal storage stability and low-temperature fixing ability are good.

The Tg of a polyester resin, so referred to hereinabove and hereinafter, is determined by the method (DSC method) prescribed in ASTM D3418-82 using Seiko Denshi Kogyo's DSC 20, SSC/580.

The polyester resin used as a toner binder (A) in the present invention can be produced in a similar manner as the production method of conventional polyester. For example, it can be produced by carrying out a reaction under an inert gas atmosphere (nitrogen gas etc.), in the presence of a catalyst (a) containing titanium, preferably at a reaction temperature of 150 to 280° C., more preferably 160 to 250° C., and most preferably 170 to 240° C. From the viewpoint of certain execution of a polycondensation reaction, the reaction time is preferably not less than 30 minutes, and particularly preferably 2 to 40 hours. An operation under reduced pressure (for example, 1 to 50 mmHg) is also effective in order to increase the reaction rate at the last stage of reaction.

From the viewpoint of polymerization activity and the like, the amount of (a) added is preferably 0.0001 to 0.8%, more preferably 0.0002 to 0.6%, and most preferably 0.0015 to 0.55%, relative to the weight of a polymer to be obtained.

Other esterification catalysts may also be used in combination unless the catalytic effect of (a) is affected. Examples of such esterification catalysts include tin-containing catalysts (for example, dibutyltin oxide), antimony trioxide, titanium-containing catalysts other than (a) [for example, titanium alkoxides, titanyl potassium oxalate, titanium terephthalate, dihydroxybis (triethanolaminato) titanium and its intramolecular polycondensates], zirconium-containing catalysts (for example, zirconium acetate), germanium-containing catalysts, alkali (or alkaline earth) metal catalysts (for example, carboxylates of alkali metal or alkaline earth metal: lithium acetate, sodium acetate, potassium acetate, calcium acetate, sodium benzoate and potassium benzoate), and zinc acetate. The amount of such catalysts to be added is preferably 0 to 0.6% relative to the resulting polymer. Adjusting the amount to 0.6% or less is preferable for use in a toner for color use because a polyester resin which is less colored is obtained. The content of (a) in the entire portion of the catalyst added is preferably 50 to 100%.

The method of producing the linear polyester resin (AX1) may be, for example, a method which includes heating a diol (g) and a dicarboxylic acid (i) to a temperature of 180° C. to 260° C. in the presence of 0.0001 to 0.8% of a catalyst (a) and, if necessary, other catalysts, relative to the weight of a polymer to be obtained to subject them to dehydration condensation under normal pressure and/or reduced pressure conditions, thereby obtaining (AX1).

The method of producing the nonlinear polyester resin (AX2) may be, for example, a method which comprises heating a diol (g), a dicarboxylic acid (i) and a tri- or more hydric polyol (h) to a temperature of 180° C. to 260° C. in the presence of 0.0001 to 0.8% of a catalyst (a) and, if necessary, other catalysts, relative to the weight of a polymer to be obtained to subject them to dehydration condensation under normal pressure and/or reduced pressure conditions, and further causing a trivalent or higher polycarboxylic acid (j) to react to give the polyester resin (AX2). The polycarboxylic acid (j) may also be caused to react simultaneously with (g), (i) and (h).

The method of producing the modified polyester resin (AY1) may be, for example, a method which comprises adding a polyepoxide (c) to a nonlinear polyester resin (AX2) and carrying out a molecule extension reaction of the polyester at a temperature of 180° C. to 260° C. to give (AY1).

The acid value of the (AX2) to be reacted with (c) is preferably from 1 to 60, and more preferably from 5 to 50. When the acid value is 1 or more, there is no fear of affecting the performance of a resin due to remaining of (c) unreacted. When it is 60 or less, the resin has good thermal stability.

The amount of (c) to be used for obtaining (AY1) is preferably 0.01 to 10%, and more preferably 0.05 to 5% relative to (AX2) from the viewpoint of low-temperature fixing ability and hot offset resistance.

The modified polyester resin (AY1) can be obtained also by adding a polyisocyanate (b) to a polyester resin (AX2) and carrying out a urthanation reaction at, for example, 130° C. to 220° C.

The hydroxyl value of the (AX2) to be reacted with (b) is preferably from 2 to 60, and more preferably from 5 to 50. When the hydroxyl value is 2 or more, the reaction rate is increased and (AY1) can be obtained easily. When it is 60 or less, the gloss is improved. The amount of (b) to be used for obtaining (AY1) is preferably 0.02 to 10%, and more preferably 0.2 to 5% relative to (AX2) from the viewpoint of reaction rate.

The toner binder (A) of the present invention may contain another resin or the like, if necessary, in addition to the above-mentioned condensation-polymerization polyester resin.

The other resin includes, for example, styrenic resins [e.g. styrene-alkyl (meth)acrylate copolymers, styrene-diene monomer copolymers], epoxy resins (e.g. ring opening polymerization products of bisphenol A diglycidyl ether, etc.), and urethane resins (e.g. polyaddition products of diol and/or tri- or more hydric polyol and diisocyanate, etc.). Preferably, the other resin has a weight average molecular weight of 1,000 to 2,000,000.

The content of the other resin in the toner binder (A) is preferably 0 to 40%, more preferably 0 to 30%, and most preferably 0 to 20%.

When two or more polyester resins are used in combination, or when at least one polyester resin is admixed with another resin, powder mixing or melt mixing may be carried out in advance or mixing may be carried out in toner preparation.

The temperature in the melt mixing is preferably 80 to 180° C., more preferably 100 to 170° C., and most preferably 120 to 160° C.

If the mixing temperature is too low, mixing cannot be accomplished satisfactorily and the system may become inhomogeneous. When the mixing temperature in mixing two or more polyester resins together is excessively high, averaging due to transesterification and other issues may occur, and it may thus become impossible to maintain those resin properties which are required of toner binders.

The mixing time for melt mixing is preferably 10 seconds to 30 minutes, more preferably 20 seconds to 10 minutes, and most preferably 30 seconds to 5 minutes. When the mixing time in mixing two or more polyester resins together is excessively long, averaging due to transesterification and other issues may occur, and it may thus become impossible to maintain those resin properties which are required of toner binders.

The mixing apparatus for melt mixing includes, for example, batch type mixing apparatus such as reaction vessels, and continuous mixing apparatus. For attaining uniform mixing at an adequate temperature for a short period of time, a continuous mixing apparatus is preferred. As continuous mixing apparatuses, there are listed extruders, continuous kneaders, three-roll mills and so on. Among them, extruders and continuous kneaders are preferred.

In the case of powder mixing, mixing can be attained using conventional mixing conditions and a conventional mixing apparatus.

Regarding the mixing conditions in powder mixing, the mixing temperature is preferably 0 to 80° C., and more preferably 10 to 60° C. The mixing time is preferably not shorter than 3 minutes, and more preferably 5 to 60 minutes. The mixing apparatus includes, for example, Henschel mixer, Nauta mixer, Tumbler mixer, ribbon blender and Banbury mixer. Preferred are Henschel mixer, Tumbler mixer and a ribbon blender.

The toner of the present invention for developing electrostatic charge images contains the toner binder (A) of the present invention and a colorant (B), if necessary together with one or more of various additives such as mold release agents (C), charge control agents (D), and fluidizing agents (E).

The content of (A) in the toner is preferably 70 to 98%, more preferably 74 to 96% when a dye or pigment is used as the colorant, and it is preferably 20 to 85%, and more preferably 35 to 65% when a magnetic powder is used.

Known dye, pigment and magnetic powder can be used for coloring agents (B). Specifically, there are listed carbon black, sudan black SM, fast yellow G, benzidine yellow, pigment yellow, indofast orange, Irgacin red, paranitroaniline red, toluidine red, carmine FB, pigment orange R, lake red 2G, rhodamine FB, rhodamine B lake, methyl violet B lake, phthalocyanine blue, pigment blue, brilliant green, phthalocyanine green, oil yellow GG, Kayaset YG, olasol brown B, oil pink OP, magnetite, iron black, and so on.

When a dye or pigment is used, for instance, the content of the colorant (B) in the toner is preferably 2 to 15%. When a magnetic powder is used, it is preferably 15 to 70%, and more preferably 30 to 60%.

Examples of the mold release agent (C) include carnauba wax (C1), Fischer-Tropsch wax (C2), paraffin wax (C3) and polyolefin wax (C4).

(C1) includes, for example, natural carnauba wax and free fatty acid eliminated carnauba wax.

(C2) includes, for example, petroleum-derived Fischer-Tropsch waxes (e.g. Schumann Sasol's Paraflint H1, Paraflint H1N4, Paraflint C105), natural gas-derived Fischer-Tropsch waxes (e.g. Shell MDS's FT 100 etc.), and purification products derived from these Fischer-Tropsch waxes by, for example, fractional crystallization (e.g. Nippon Seiro's MDP-7000, MDP-7010).

(C3) includes, for example, petroleum wax-based paraffin waxes (e.g. Nippon Seiro's paraffin waxes HNP-5, HNP-9, HNP-11).

(C4) includes, for example, polyethylene waxes (e.g. Sanyo Chemical Industries' Sanwax 171P, Sanwax LEL 400 P), and polypropylene waxes (e.g. Sanyo Chemical Industries' Viscol 550P, Viscol 660P).

Among them, carnauba waxes and Fischer-Tropsch waxes are preferred. More preferred are carnauba waxes and petroleum-derived Fischer-Tropsch waxes. The use of such a wax as a mold release agent results in more improved low-temperature fixing ability when the binder is used in preparing toners.

The content of (C) in the toner is preferably 0 to 10%, and more preferably 1 to 7%.

The charge control agent (D) includes, for example, nigrosine dyes, quaternary ammonium salt compounds, quaternary ammonium salt group-containing polymers, metal-containing azo dyes, salicylic acid metal salts, sulfonic acid group-containing polymers, fluorine-containing polymers, and halogen-substituted aromatic ring-containing polymers.

The content of (D) in the toner is preferably 0 to 5%, and more preferably 0.01 to 4%.

The fluidizing agent (E) includes, for examples, known compounds such as colloidal silica, alumina powder, titanium oxide powder and calcium carbonate powder.

The content of (E) in the toner is preferably 0 to 5%.

Methods of manufacturing the toner include a known kneading and pulverizing method. After dry blending of the toner constituents mentioned above, the mixture is melt-kneaded and then finely ground using a jet mill or the like, followed by air classification, whereby particles generally having a volume average particle diameter D50 of 2 to 20 μm are obtained.

The particle diameter D50 can be determined using a Coulter counter [e.g. commercial name: Multisizer III (product of Coulter)].

The toner of the present invention prepared by using the toner binder of the invention, if necessary admixing with carrier particles such as a magnetic powder (e.g. iron powder, nickel powder, ferrite, magnetite), glass beads, and/or ferrite whose surface is coated with a resin (e.g. acrylic resin, silicone resin), is used as an electric latent image developer. It is also possible to form electric latent images by friction with such a member as a charging blade in lieu of the use of carrier particles.

The toner is then fixed to a support (e.g. paper, polyester film) by the conventional heat roll fixing method, for instance, to give a recorded material.

EXAMPLES

Hereinbelow, the present invention will be further described with reference to Examples, by which the present invention is not limited. In the following, "part(s)" means "part(s) by weight".

The method of determining the softening point as used in the examples and comparative examples is as follows.
[Softening Point Determination Method]

A flow tester was used, and the temperature was raised at a constant rate under the following conditions. The temperature at which the amount of the resin flown out reaches ½ is the softening point.

Apparatus: Flow Tester CFT-500D manufactured by Shimadzu Corp.
Load: 20 kgf/cm$^2$
Die: 1 mm φ-1 mm
Rate of temperature rise: 6° C./min
Sample amount: 1.0 g Example 1

Synthesis of Catalyst (a)

A reaction vessel equipped with a condenser, a stirrer and a nitrogen inlet tube capable of bubbling liquid phase was charged with 126 parts of ethyl acetate and 200 parts of terephthalic acid. While bubbling liquid phase with nitrogen, the temperature was raised slowly to 60° C. While 1617 parts of titanium tetraisopropoxide was dropped, a reaction was carried out at 60° C. for 4 hours. Thus, a reaction mixture in the form of slurry was obtained. The reaction mixture was separated through a filter paper and dried at 40° C./20 kPa·s. Thus, a mixture (a-1) of titanium triisopropoxyterephthalate and unreacted terephthalic acid (content of titanium triisopropoxyterephthalate: 65%) was obtained. The solubility of (a-1) in water was 0.6 g/100 ml and the solubility in water of titanium triisopropoxyterephthalate obtained by further refining was 0.9 g/100 ml.

[Linear Polyester Resin Synthesis]

A reaction vessel equipped with a condenser, a stirrer and a nitrogen inlet tube was charged with 430 parts of bisphenol A-PO (2 moles) adduct, 300 parts of bisphenol A-PO (3 moles) adduct, 257 parts of terephthalic acid, 65 parts of isophthalic acid, 10 parts of maleic anhydride, and 3.08 parts of catalyst (a-1) (actually, a mixture of 2 parts of titanium triisopropoxyterephthalate and 1.08 parts of terephthalic acid unreacted) as a polycondensation catalyst, and a reaction was carried out under a nitrogen stream at 220° C. for 10 hours while distilling off the byproduct water. Then, the reaction was further allowed to proceed under reduced pressure (5 to 20 mm Hg) and when the acid value reached 4, the product was taken out, cooled to room temperature, and ground to give a linear polyester resin (AX1-1).

(AX1-1) contained no THF-insoluble fraction and had an acid value of 5, a hydroxyl value of 12, a Tg of 60° C., an Mn of 6,980, and an Mp of 19,000. The ratio of components having a molecular weight of 1500 or less was 0.9%.

[Nonlinear Polyester Resin Synthesis]

A reaction vessel equipped with a condenser, a stirrer and a nitrogen inlet tube was charged with 350 parts of bisphenol A-EO (2 moles) adduct, 326 parts of bisphenol A-PO (3 moles) adduct, 278 parts of terephthalic acid, 40 parts of phthalic anhydride, and 3.08 parts of (a-1) as a polycondensation catalyst, and a reaction was carried out under a nitrogen stream at 230° C. for 10 hours while distilling off the byproduct water. Then, the reaction was further allowed to proceed under reduced pressure (5 to 20 mm Hg) and when the acid value fell to 2 or less, the temperature was lowered to 180° C., 62 parts of trimellitic anhydride was added, and a reaction was allowed to proceed at ordinary pressure for 2 hours in a hermetic condition. The product was then taken out, cooled to room temperature, and ground to give a nonlinear polyester resin (AX2-1).

(AX2-1) contained no THF-insoluble fraction and had an acid value of 35, a hydroxyl value of 18, a Tg of 68° C., an Mn of 3,900, and an Mp of 11,000. The ratio of components having a molecular weight of 1500 or less was 0.7%.

[Synthesis of Toner Binder]

400 parts of (AX1-1) and 600 parts of (AX2-1) were subjected to powder mixing in a Henschel mixer at 25° C. for 8 minutes to give a toner binder (TB1) of the present invention.

Comparative Example 1

Comparative Linear Polyester Resin Synthesis

A reaction was carried out in the same manner as in the case of (AX1-1) in Example 1 except that the polycondensation catalyst was changed to 2 parts of titanium tetraisopropoxide. But a problem arose, that is, the reaction stopped halfway due to catalyst deactivation and no more byproduct water distilled off. Therefore, four 2-part portions of titanium tetraisopropoxide were added during the reaction to give a comparative nonlinear polyester resin (CAX1-1).

(CAX1-1) contained no THF-insoluble fraction and had an acid value of 7, a hydroxyl value of 12, a Tg of 58° C., an Mn of 6,220, and an Mp of 18,900. The ratio of components having a molecular weight of 1500 or less was 2.2%.

[Comparative Nonlinear Polyester Resin Synthesis]

A reaction was carried out in the same manner as in the case of (AX2-1) in Example 1 except that the polycondensation catalyst was changed to 2 parts of titanium tetraisopropoxide. The reaction was carried out under ordinary pressure for 16 hours and under reduced pressure for 8 hours. The rate of reaction was slow, three 2-part portions of titanium tetrapropoxide were added during the reaction to give a comparative nonlinear polyester resin (CAX2-1).

(CAX2-1) contained no THF-insoluble fraction and had an acid value of 34, a hydroxyl value of 16, a Tg of 68° C., an Mn of 3,420, and an Mp of 12,100. The ratio of components having a molecular weight of 1500 or less was 2.1%.

[Comparative Toner Binder Synthesis]

A comparative toner binder (CTB1) was obtained in the same manner as the method of obtaining (TB1) of Example 1 except for using 400 parts of (CAX1-1) and 600 parts of (CAX2-1).

Example [1] and Comparative Example [1]

For each of the toner binder (TB1) of the present invention and the comparative toner binder (CTB1), 100 parts of the toner binder was premixed with 5 parts of carnauba wax and 4 parts of a yellow pigment [toner yellow HG VP2155, product of Clariant] using a Henschel mixer [model FM10B, product of Mitsui Miike Kakoki], and the mixture was kneaded in a twin-screw kneader [model PCM-30, product of Ikegai Corp.]. The mixture was then finely pulverized using a supersonic jet pulverizer [Labojet, product of Nippon Pneumatic Mfg. Co.], followed by classification using an air classifier [model MDS-I, product of Nippon Pneumatic] to give toner particles with a particle diameter D50 of 8 μm. Then, 0.5 parts of colloidal silica [Aerosil R972, product of Nippon Aerosil] was admixed with 100 parts of the toner particles in a sample mill. In this way, toner (T1) and comparative toner (CT1) were obtained.

The results of evaluations made by the following evaluation methods are shown in Table 1.

[Method of Evaluation]

(1) Gloss Manifesting Temperature (GLOSS)

A two-component developer for the evaluation was prepared by uniformly mixing up 30 parts of each toner and 800 parts of a ferrite carrier (F-150; product of Powdertech Co.). Unfixed images developed on a commercial copier (AR 5030; product of Sharp Corp.) using the developer were fixed at a process speed of 120 mm/sec on a fixing machine prepared by modifying the fixing unit of a commercial printer (LBP 2160; product of Canon Inc.) so that the heat roller temperature might be varied. The fixing roll temperature at which the fixed image showed a 60° gloss of not less than 10% was determined using a commercial glossmeter (MURAKAMI COLOR RESEARCH LABORATORY model gmx-202-60) and recorded as the gloss manifesting temperature.

(2) Hot Offset Occurrence Temperature (HOT)

Like the above GLOSS, evaluation of fixing was made, and the existence of hot offset on a fixed image was evaluated visually. A fixing roll temperature, at which hot offset was occurred, was made an hot offset occurrence temperature.

(3) Test of Toner's Anti-Blocking Property

Each developer prepared as described above in (1) was conditioned in a high-temperature and high-humidity environment (50° C., 85% R. H.) for 48 hours. Under the same environment the blocking state of each developer was visually judged, and the image quality of a copy produced by use of a commercially available copier (AR5030; produced by Sharp Corp.) was also observed.

Criterion

⊙: No blocking of the toner is recognized and image quality is good.

○: No blocking of the toner is recognized, but slight disorder in image quality after 1000-sheet copying is recognized.

Δ: Blocking of the toner is visually recognized and disorder in image quality after 1000-sheet copying is recognized.

x: Blocking of the toner is visually recognized and images are no longer formed before 1000-sheet copying.

TABLE 1

| | Toner | GLOSS (° C.) | HOT (° C.) | Anti-blocking property |
|---|---|---|---|---|
| Example [1] | (T1) | 130 | 200 or more | ⊙ |
| Comparative Example [1] | (CT1) | 130 | 200 or more | Δ |

The polycondensation catalyst (a) used in the present invention has excellent catalytic activity and, as described above, the amount of low molecular weight components having molecular weights not more than 1500 was successfully reduced.

Further, the results in Table 1 show that the toner of the present invention has good low-temperature fixing ability and causes no blocking of toner even under high temperature and high humidity.

Example 2

Modified Polyester Resin Synthesis

A reaction vessel equipped with a condenser, a stirrer and a nitrogen inlet tube was charged with 532 parts of bisphenol A-PO (2 moles) adduct, 40 parts of bisphenol A-PO (3 moles) adduct, 133 parts of bisphenol A-EO (2 moles) adduct, 10 parts of phenol novolak (average degree of polymerization: about 5)-EO (5 moles) adduct, 252 parts of terephthalic acid, 19 parts of isophthalic acid, 10 parts of trimellitic anhydride, and 3.08 parts of (a-1) as a polycondensation catalyst, and a reaction was carried out under a nitrogen stream at 230° C. for 10 hours while distilling off the byproduct water. Then, the reaction was further allowed to proceed under reduced pressure (5 to 20 mm Hg) until the acid value reached not more than 2. Then, the temperature was adjusted to 208° C. and 50 parts of trimellitic anhydride was added. A reaction was allowed to proceed at ordinary pressure for 1 hour and then under reduced pressure (20 to 40 mm Hg) and when the softening point arrived at 105° C., 20 parts of bisphenol A diglycidyl ether was added. When a softening point of 150° C. was attained, the product was taken out, cooled to room temperature, and ground to give a modified polyester resin (AY1-1).

(AY1-1) had an acid value of 23, a hydroxyl value of 20, a Tg of 69° C., an Mn of 2,500, an Mp of 5,700, a THF-insoluble matter content of 30%, and a ratio of components having a molecular weight of 1500 or less of 0.6%. This was used as a toner binder (TB2).

Example 3

Synthesis of Catalyst (a)

A reaction vessel equipped with a condenser, a stirrer and a nitrogen inlet tube capable of bubbling liquid phase was charged with 520 parts of ethyl acetate and 340 parts of isophthalic acid. While bubbling liquid phase with nitrogen, the temperature was raised slowly to 60° C. While 284 parts of titanium tetraisopropoxide was dropped, a reaction was carried out at 60° C. for 5 hours. Thus, a reaction mixture in the form of slurry was obtained. The reaction mixture was separated through a filter paper and dried at 40° C./20 kPa·s. Thus, a mixture of titanium diisopropoxydiisophthalate and unreacted isophthalic acid (a-2; content of titanium diisopropoxydiisophthalate: 95%) was obtained. The solubility of (a-2) in water was 0.3 g/100 ml and the solubility in water of titanium diisopropoxydiisophthalate obtained by further refining was also 0.3 g/100 ml.

[Modified Polyester Resin Synthesis]

A modified polyester resin (AY1-2) was produced by carrying out a reaction in the same manner as in the case of (AY1-1) in Example 2 except changing the condensation catalyst (a-1) to (a-2), followed by taking out a product at a softening point of 150° C., cooling it to room temperature and grinding it.

(AY1-2) had an acid value of 22, a hydroxyl value of 20, a Tg of 68° C., an Mn of 2,520, an Mp of 5,750, a THF-insoluble matter content of 32%, and a ratio of components having a molecular weight of 1500 or less of 0.4%. This was used as a toner binder (TB3).

Example 4

Synthesis of Catalyst (a)

A reaction vessel equipped with a condenser, a stirrer and a nitrogen inlet tube capable of bubbling liquid phase was charged with 520 parts of ethyl acetate and 244 parts of benzoic acid. While bubbling liquid phase with nitrogen, the temperature was raised slowly to 60° C. While 284 parts of titanium tetraisopropoxide was dropped, a reaction was carried out at 60° C. for 5 hours. Then, 50 parts of ion exchange water was added, followed by a reaction for 30 minutes. Thus, a reaction mixture in the form of slurry was obtained. The reaction mixture was separated through a filter paper and dried at 40° C./20 kPa·s. Thus, titanium dihydroxydibenzenecarboxylate (a-3) was obtained. The solubility of (a-3) in water was 0.1 g/100 ml.

[Modified Polyester Resin Synthesis]

A modified polyester resin (AY1-3) was produced by carrying out a reaction in the same manner as in the case of (AY1-1) in Example 2 except changing the condensation catalyst (a-1) to (a-3), followed by taking out a product at a softening point of 150° C., cooling it to room temperature and grinding it.

(AY1-3) had an acid value of 21, a hydroxyl value of 21, a Tg of 67° C., an Mn of 2,490, an Mp of 5,680, a THF-insoluble matter content of 30%, and a ratio of components having a molecular weight of 1500 or less of 0.5%. This was used as a toner binder (TB4).

Comparative Example 2

Comparative Modified Polyester Resin Synthesis

A comparative modified polyester resin (CAY1-2) was produced by carrying out a reaction in the same manner as in Example 2 except changing the polycondensation catalyst to 2 parts of titanium tetrabutoxide.

(CAY1-2) had a softening point of 150° C., an acid value of 53, a hydroxyl value of 17, a Tg of 71° C., an Mn of 1,660, an Mp of 6,340, a THF-insoluble matter content of 34%, and a ratio of components having a molecular weight of 1500 or less of 3.1%. This was used as a toner binder (CTB2).

Example 5

Nonlinear Polyester Resin Synthesis

A reaction vessel equipped with a condenser, a stirrer and a nitrogen inlet tube was charged with 410 parts of bisphenol A-PO (2 moles) adduct, 270 parts of bisphenol A-PO (3 moles) adduct, 110 parts of terephthalic acid, 125 parts of isophthalic acid, 15 parts of maleic anhydride, and 3.08 parts of (a-1) as a polycondensation catalyst, and a reaction was carried out under a nitrogen stream at 220° C. for 10 hours while distilling off the byproduct water. Then, the reaction was further allowed to proceed under reduced pressure (5 to 20 mm Hg) and when the acid value became not more than 2, the reaction mixture was cooled to 180° C. and 25 parts of trimellitic anhydride was added. A reaction was allowed to proceed at ordinary pressure in a hermetic condition for 2 hours and, then, the product was taken out, cooled to room temperature, and ground to give a nonlinear polyester resin (AX2-3).

(AX2-3) contained no THF-insoluble fraction and had an acid value of 18, a hydroxyl value of 35, a Tg of 62° C., an Mn of 2,310, and an Mp of 5,470. The ratio of components having a molecular weight of 1500 or less was 0.9%.

[Modified Polyester Resin Synthesis]

A reaction vessel equipped with a condenser, a stirrer and a nitrogen inlet tube was charged with 317 parts of bisphenol A-EO (2 moles) adduct, 57 parts of bisphenol A-PO (2 moles) adduct, 298 parts of bisphenol A-PO (3 moles) adduct, 75 parts of phenol novolak (average degree of polymerization: about 5)-PO (5 moles) adduct, 30 parts of isophthalic acid, 157 parts of terephthalic acid, 27 parts of maleic anhydride, and 3.08 parts of (a-1) as a polycondensation catalyst, and a reaction was carried out under a nitrogen stream at 230° C. for 10 hours while distilling off the byproduct water. Then, the reaction was further allowed to proceed under reduced pressure (5 to 20 mm Hg) and, when the acid value became not more than 2, the reaction mixture was cooled to 180° C. Then, 68 parts of trimellitic anhydride was added, the reaction was allowed to proceed at ordinary pressure for 1 hour and then under reduced pressure (20 to 40 mm Hg) and when the softening point arrived at 120° C., 25 parts of bisphenol A diglycidyl ether was added. When a softening point of 155° C. was attained, the product was taken out, cooled to room temperature, and ground to give a modified polyester resin (AY1-4).

(AY1-4) had an acid value of 10, a hydroxyl value of 27, a Tg of 61° C., an Mn of 3,100, an Mp of 6,000, a THF-insoluble matter content of 32%. The ratio of components having a molecular weight of 1500 or less was 0.7%.

[Synthesis of Toner Binder]

500 parts of (AX2-3) and 500 parts of (AY1-4) were melt mixed in a continuous kneader at a jacket temperature of 150° C. and a retention time of 3 minutes. The melted resin was cooled to 30° C. in 4 minutes using a steel belt cooler, followed by grinding to give a toner binder (TB5) of the present invention.

Examples [2] to [5] and Comparative Example [2]

For each of the toner binders (TB2) to (TB5) of the present invention and the comparative toner binder (CTB2), 100 parts of the toner binder was premixed with 8 parts of carbon black MA-100 (product of Mitsubishi Chemical), 5 parts of carnauba wax and 1 part of a charge control agent T-77 (product of Hodogaya Chemical) using a Henschel mixer [model FM10B, product of Mitsui Miike Kakoki], and the mixture was kneaded in a twin-screw kneader [model PCM-30, product of Ikegai Corp.]. The mixture was then finely pulverized using a supersonic jet pulverizer [Labojet, product of Nippon Pneumatic Mfg. Co.], followed by classification using an air classifier [model MDS-I, product of Nippon Pneumatic Mfg. Co.] to give toner particles with a particle diameter D50 of 9 μm. Then, 0.3 parts of colloidal silica [Aerosil R972, product of Nippon Aerosil] was admixed with 100 parts of the toner particles in a sample mill. In this way, toners (T2) to (T5) and a comparative toner (CT2) were obtained.

The results of evaluations made by the following evaluation methods are shown in Table 2.

[Method of Evaluation]

(1) Minimum Fixing Temperature (MFT)

A two-component developer for the evaluation was prepared by uniformly mixing up 30 parts of each toner and 800 parts of a ferrite carrier (F-150; product of Powdertech Co.). Unfixed images developed on a commercial copier (AR 5030; product of Sharp Corp.) using the developer were fixed at a process speed of 145 mm/sec on a fixing machine prepared by modifying the fixing unit of a commercial copier (SF 8400A; product of Sharp) so that the heat roller temperature might be varied. A fixing roll temperature, at which a image density remaining percentage after rubbing of a fixed image by a pad became at least 70%, was made a minimum fixing temperature.

(2) Hot Offset Occurrence Temperature (HOT)

Like the above MFT, evaluation of fixing was made, and the existence of hot offset on a fixed image was evaluated visually. A fixing roll temperature, at which hot offset was occurred, was made an hot offset occurrence temperature.

(3) Test of Toner's Anti-Blocking Property

Each developer prepared as described above in (1) was conditioned in a high-temperature and high-humidity environment (50° C., 85% R.H.) for 48 hours. Under the same environment the blocking state of each developer was visually judged, and the image quality of a copy produced by use of a commercially available copier (AR5030; produced by Sharp Corp.) was also observed.

Evaluation was made under the same criterion as mentioned above.

TABLE 2

| | Toner | MFT (° C.) | HOT (° C.) | Anti-blocking property |
|---|---|---|---|---|
| Example [2] | (T2) | 140 | 225 | ⊙ |
| Example [3] | (T3) | 135 | 230 | ⊙ |
| Example [4] | (T4) | 130 | 230 | ⊙ |
| Example [5] | (T5) | 130 | 230 | ⊙ |
| Comparative Example [2] | (CT2) | 140 | 225 | Δ |

The polycondensation catalyst (a) used in the present invention has excellent catalytic activity and, as described above, the amount of low molecular weight components having molecular weights not more than 1500 was successfully reduced.

Further, the results in Table 2 show that the toner of the present invention has good low-temperature fixing ability and causes no blocking of toner even under high temperature and high humidity.

INDUSTRIAL APPLICABILITY

The toner binder of the present invention and the toner of the present invention containing the same are useful as a toner for developing electrostatic charge images because they are excellent in both anti-blocking property under high temperature and high humidity and low-temperature fixing ability of a toner.

The invention claimed is:

1. A method for producing a polyester resin (AX) for toner binder for developing electrostatic charge images, comprising;

providing in a reaction vessel a polyol and a polycarboxylic acid, and reacting the polyol with the polycarboxylic acid to form a condensation-polymerization polyester resin in the presence of a catalyst containing a catalyst (a) represented by the following general formula (I):

$$Ti(-X)_m(-OR)_n \quad (I)$$

wherein R is H or a hydrocarbon group having from 1 to 24 carbon atoms which may contain from 1 to 3 ether bonds and/or from 1 to 2 hydroxyl groups; X is a residue formed by removing H of one carboxyl group from an aromatic mono- or polycarboxylic acid, provided that in the case of a polycarboxylic acid, a carboxyl group other than said one carboxyl group may intramolecularly polycondense with an OR group in the same molecule to form a ring structure or may intermolecularly polycondense with an OR group in another molecule to form a structure containing from 2 to 5 Ti atoms; m=1 to 3, n=1 to 3, and the sum of m and n is 4, wherein the content of the catalyst (a) in the entire portion of the catalyst present is 50 to 100% by weight.

2. The method for producing a polyester resin (AX) for toner binder for developing electrostatic charge images according to claim 1, wherein the catalyst (a) has a solubility in water of 5 g/100 ml or less at 30° C.

3. The method for producing a polyester resin (AX) for toner binder for developing electrostatic charge images according to claim 1, wherein not less than 80% of the ester bonds of the polyester resin (AX) are formed by dehydration condensation.

4. The method for producing a polyester resin (AX) for toner binder for developing electrostatic charge images according to claim 2, wherein not less than 80% of the ester bonds of the polyester resin (AX) are formed by dehydration condensation.

5. A method for producing a modified polyester resin (AY) for toner binder for developing electrostatic charge images, comprising;

producing a polyester resin (AX) by the method according to claim 1, and reacting further a polyisocyanate (b) and/or polyepoxide (c) with the polyester resin (AX).

6. The method for producing a modified polyester resin (AY) for toner binder for developing electrostatic charge images according to claim 5, wherein the catalyst (a) used in the method according to claim 7 has a solubility in water of 5 g/100 ml or less at 30° C.

7. The method for producing a modified polyester resin (AY) for toner binder for developing electrostatic charge images according to claim 5, wherein not less than 80% of the ester bonds of the polyester resin (AX) produced are formed by dehydration condensation.

8. The method for producing a modified polyester resin (AY) for toner binder for developing electrostatic charge images according to claim 6, wherein not less than 80% of the ester bonds of the polyester resin (AX) produced are formed by dehydration condensation.

9. A method for producing a toner for developing electrostatic charge images, comprising;
- producing a polyester resin (AX) by the method according to claim 1, and
- mixing the polyester resin (AX) and a colorant (B) and, according to need, one or more optional resins other than the polyester resin (AX).

10. The method for producing a toner for developing electrostatic charge images according to claim 9, wherein at least one additive selected from a mold release agent (C), a charge control agent (D) and a fluidizing agent (E) is further mixed in addition to the colorant (B).

11. A method for producing a toner for developing electrostatic charge images, comprising;
- producing a polyester resin (AY) by the method according to claim 5, and
- mixing the polyester resin (AY) and a colorant (B) and, according to need, one or more optional resins other than the polyester resin (AY).

12. The method for producing a toner for developing electrostatic charge images according to claim 1, wherein at least one additive selected from a mold release agent (C), a charge control agent (D) and a fluidizing agent (E) is further mixed in addition to the colorant (B).

\* \* \* \* \*